United States Patent [19]

Yamamoto et al.

[11] Patent Number: 5,187,283

[45] Date of Patent: Feb. 16, 1993

[54] PROCESS FOR THE PREPARATION OF INDIGO COMPOUNDS

[75] Inventors: Yoshihiro Yamamoto, Yokohama; Usaji Takaki, Fujisawa; Shinobu Aoki; Yoshihisa Inoue, both of Yokohama; Isao Hara, Kanagawa, all of Japan

[73] Assignee: Mitsui Toatsu Chemicals, Inc., Tokyo, Japan

[21] Appl. No.: 796,265

[22] Filed: Nov. 21, 1991

[30] Foreign Application Priority Data

Nov. 22, 1990 [JP] Japan .................................. 2-316209
Apr. 10, 1991 [JP] Japan .................................. 3-077628

[51] Int. Cl.$^5$ ............................................ C07D 403/04
[52] U.S. Cl. ..................................... 548/457; 548/459
[58] Field of Search ................................ 548/457, 459

[56] References Cited

U.S. PATENT DOCUMENTS 4,992,556  2/1991  Takaki et al. ...................... 548/457

FOREIGN PATENT DOCUMENTS 0330419  8/1989  European Pat. Off. .
0335524  10/1989  European Pat. Off. ............ 548/457
0339887  11/1989  European Pat. Off. ............ 548/457
0368508  5/1990  European Pat. Off. ............ 548/457
3-074470  3/1991  Japan .................................. 548/457
9613  of 1902  United Kingdom ................ 548/457

OTHER PUBLICATIONS

CA 114:124552y (Apr. 8, 1991).

Primary Examiner—David B. Springer
Attorney, Agent, or Firm—Millen, White, Zelano and Branigan

[57] ABSTRACT

An indigo compound is prepared from a corresponding indole compound which is unsubstituted at the 2- and 3-positions. The indole compound and an organic hydroperoxide are reacted in the presence of a catalyst which is a metal selected from the group consisting of the metals of Groups 4, 5 and 6 of the periodic table or a compound of the metal. The reaction is conducted while taking out water from a reaction system, said water being that introduced in the reaction system or formed during the reaction, or while controlling the amount of water, which is introduced in the reaction system, at a level not greater than 1 mole per mole of the indole compound.

13 Claims, No Drawings

PROCESS FOR THE PREPARATION OF INDIGO COMPOUNDS

BACKGROUND OF THE INVENTION

A) Field of the Invention

The present invention relates to a process for the preparation of an indigo compound important as a dyestuff. More specifically, the present invention is concerned with a process for preparing an indigo compound by reacting its corresponding indole compound, which is unsubstituted at the 2- and 3-positions thereof, with an organic perhydroxide in the presence of a specific catalyst.

B) Description of the Related Art

According to the process adopted these days for the industrial preparation of indigo, a salt of N-phenylglycine is formed using aniline and chloroacetic acid or aniline, prussic acid and formaldehyde as raw materials. The salt is subjected to alkali fusion at an elevated temperature, whereby the salt is converted to an indoxyl compound. The indoxyl compound is then oxidized with air to indigo. This process, however, is accompanied by the problems that it includes such many and extremely complex reaction steps and, moreover, requires potassium hydroxide and sodium hydroxide in large amounts, resulting in the consumption of large energy upon their recovery and reuse and the need for special equipment therefor. There is hence an outstanding desire for the conversion to a simpler process.

Takaki, one of inventors in the present application, and his colleagues disclosed in Japanese Patent Application Laid-Open No. HEI 1-215859(A) a process for the preparation of an indigo compound, which features reaction of an indole compound which is unsubstituted at the 2- and 3-positions with an organic hydroperoxide. They also disclosed in Japanese Patent Application Laid-Open No. HEI 3-768(A) another process for the preparation of an indigo compound, which features reaction of the same indole compound with the same oxidizing agent in the presence of a metal compound catalyst which catalyzes the oxidation of the carbon atom at the 3-position of the indole compound, and/or in the presence of an additive. The yield of the indigo compound and the reaction velocity were, however, still not sufficient even with these processes.

SUMMARY OF THE INVENTION

An object of the present invention is to provide a process for preparing an indigo compound from an indole compound as a raw material in a higher yield and at a higher formation velocity than those processes described above.

To attain the above object, the present inventors have proceeded with an extensive research. As a result, it has been found that an indigo compound corresponding to an indole compound as a raw material can be obtained easily by a single-step reaction and, moreover, in a high yield and at a high formation velocity when they are reacted in the presence of a particular catalyst while taking out water from a reaction system or limiting water introduced into the reaction system, leading to the completion of the present invention.

This invention therefore provides a process for the preparation of an indigo compound from a corresponding indole compound which is unsubstituted at the 2- and 3-positions, which comprises reacting the indole compound with an organic hydroperoxide in the presence of a metal selected from the group consisting of the metals in Groups 4, 5 and 6 of the periodic table or a compound of the metal as a catalyst while taking out water from a reaction system, said water being that introduced in the reaction system or formed during the reaction; or reacting the indole compound with an organic hydroperoxide in the presence of a metal selected from the group consisting of the metals in Groups 4, 5 and 6 of the periodic table or a compound of the metal as a catalyst while controlling the amount of water, which is introduced in a reaction system, at a level not greater than 1 mole per mole of the indole compound.

DETAILED DESCRIPTION OF THE INVENTION

As a result of various investigations conducted based on the disclosures of Japanese patent Application Laid-Open Nos. HEI 1-215859(A) and 3-768(A) referred to above, the water content in the system has been found to play an extremely important role. Japanese Patent Application Laid-Open No. HEI 3-768 discloses the use of an additive in the system and recites a drying agent as the additive. The use of a drying agent is, however, accompanied by drawbacks such that, if the drying agent is solid, it is difficult to separate the drying agent from a precipitate of the resulting indigo compound and, even if a drying agent soluble in the liquid mixture in the system is used, a reaction product of the drying agent and water gives often adverse effects on the intended reaction. The present invention is free of such drawbacks and, as an extremely advantageous feature, permits control of the water content in the reaction system.

In the process of the present invention, indole molecules are dimerized via a double bond between their carbon atoms at the 2-position, and each carbon atom at the 3-position undergoes bonding with an oxygen atom to form an indigo compound. The indole compound employed as a raw material in the process of the present invention, therefore, must not contain any substituent at the 2-position and the 3-position. Illustrative of such an indole compound which is unsubstituted at the 2- and 3-positions include indole; alkylindoles having 1 to 4 alkyl groups of 1 to 10 carbon atoms, such as 1-methylindole, 4-ethylindole, 5-methylindole, indole, 6-isopropylindole, 7-methylindole and 4,5-dimethylindole; cycloalkylindoles having 1 to 4 cyclo-alkyl groups of 3 to 12 carbon atoms, such as 4-cyclo-hexylindole and 5-cyclopentylindole; arylindoles having 1 to 4 aryl or alkyl-substituted aryl groups of 6 to 30 carbon atoms, such as 5-phenylindole and 6-$\beta$-naphthyl-indole; halogenated indoles having 1 to 4 halogen dichloroindole, 5-bromoindole, 6-bromoindole, 5,7-bromoindole and 4-chloro-5-bromoindole; hydroxy indoles having 1 to 4 hydroxyl groups, such as 4-hydroxyindole, 5-hydroxyindole and 4,5-dihydroxyindole; alkoxyindoles having 1 to 4 alkoxyl groups of 1 to 10 carbon atoms, such as 4-methoxyindole and 5-benzyloxy-indole; phenoxyindoles having 1 to 4 phenoxy groups of 6 to 30 carbon atoms, such as 5-phenoxyindole; halogenated alkylindoles having 1 to 3 halogen atoms and 1 t 3 alkyl groups of 1 to 10 carbon atoms, such as 4-chloro-5-ethylindole, 6-chloro-4-methylindole, 4 -bromo-5 -ethylindole and 5-bromo-4-methylindole; nitroindoles having 1 to 4 nitro groups, such as 4-nitroindole, 5-nitroindole and 7-nitroindole; acyl indoles having 1 t 4 acyl groups of 2 to 20 carbon atoms, such as 1-benzoylindole and 4- acetylindole; acyloxyindoles having 1 to 4 acyloxy groups of 2 to 20 carbon atoms, such as 1-acetoxyindole and 4-benzoyloxyindole; indole- 7 carboxylic acids and their esters, such as indole-5-carboxylic acid; N,N-dialkylaminoindoles having 1 to 4 N,N-di(alkyl of 1 to 10 carbon atoms)amino groups, such as 5-N,N-dimethylaminoindole; and sulfonated indoles. In addition, indoles having two or more types of substituents out of the substituents described above are also included. Further, those having one or more substituents at positions other than the 2- and 3-positions may also included provided that such substituents do not give adverse effects to the reaction. Among these indole compounds, indole, alkylindoles and halogenated indoles are preferred, with indole being particularly preferred.

The organic hydroperoxide, which is the other raw material in the process of the present invention, is an organic compound having a hydroperoxy group represented by the following formula (1).

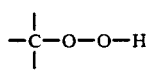
(1)

Useful organic hydroperoxides are enumerated, for example, in the tables given in D.Swern, "Organic Peroxides, Vol.II", Wiley-Interscience (1971), pp.107-127 and in the tables given in A.G.Davies, "Organic Peroxides", Butterworths (1961), pp.9-33.

Among them, preferred examples of the organic hydroperoxide include secondary or tertiary alkyl hydroperoxides having 3 to 30 carbon atoms such as tert-butyl hydroperoxide, 1-phenylethyl hydroperoxide, 1-methyl-1-phenylethyl hydroperoxide (common name: cumene hydroperoxide), bis(1-methylethyl)phenyl hydroperoxide, 1-methyl-1-(4-methylcyclohexyl)ethyl hydroperoxide, 2,5-dimethylhexane-2,5-dihydroperoxide and 1,1,3,3-tetramethylbutyl hydroperoxide. These organic hydroperoxides can be used either singly or in combination. Further, two or more of these organic hydroperoxides can also be used successively. In addition, these organic hydroperoxides may also be combinations of components, which combinations can yield these organic hydroperoxides in the reaction system, for example, the combination of isopropylbenzene and an oxygen-bearing gas. Although no particular limitation is imposed on the amount of such an organic hydroperoxide to be used, the organic hydroperoxide can used generally in a range of 0.01-100 moles, preferably in a range of 0.1-20 moles, and more preferably in a range of 0.2-10 moles, all per mole of the indole compound.

Specific examples of the metal selected from the group consisting of the metals of groups 4, 5 and 6 of the periodic table or the compound of the metal, said metal or metal compound being used as a catalyst in the process of the present invention, include metals such as titanium, zirconium, hafnium, vanadium, niobium, tantalum, chromium, molybdenum and tungsten; and compounds of these metals. Illustrative examples of inorganic compounds of such metals include their halides, oxyhalides, oxides, mixed oxides, sulfides, borides, phosphides, hydroxides, oxyhydroxides and cyanocomplexes; their inorganic acid salts, e.g., sulfates, nitrates and phosphates; their metallic oxyacids, e.g., titanic acid, molybdic acid and tungstic acid, and salts thereof; and their heteropolyacids, e.g., phosphomolybdic acid and silicotungstic acid, and salts thereof. Illustrative examples of organic compounds of these metals include their compounds containing an organic group in at least a part thereof, for example, their organic acid salts such as acetates, oxalates, benzoates and naphthenates, their alkoxides such as ethoxides and isopropoxides, and their phenoxides such as phenoxides and metachloro-phenoxides; and their complexes, for example, carbonyl complexes, amine complexes, pyridine complexes such as pyridine and bipyridyl complexes, oxo complexes, thiolate complexes such as cysteine and dithiocatechol complexes, sulfide complexes, dithiocarbamate complexes, thiocyanato complexes, isocyanato complexes, nitrosyl complexes, phosphine complexes such as triphenyl-phosphine and 1,2-diphenylphosphinoethane complexes, phosphoryl complexes, phthalocyanine complexes, porphyrin complexes, nitrile complexes, ether complexes, ketone complexes, β-ketocarbonyl complexes such as acetyl acetonate complexes, alkyl or allene complexes, olefin complexes and cyclopentadienyl complexes. Also included are compounds which can be classified into plural ones of the above-described types of compounds. These compounds can be used either singly or in combination. Further, combinations of components, said combinations being capable of yielding these compounds in the reaction system, can also be used. Although these compounds are preferably soluble in the reaction mixture, they may be partially or totally insoluble therein. Of these compounds, compounds of titanium or molybdenum metal are preferred. Although no particular limitation is imposed on the amount of such a compound, it may be 0.5 mole or less, preferably in a range of 0.000001 to 0.1 mole, more preferably in a range of 0.00001 to 0.1 mole, all per mole of the indole compound.

The process of the present invention is generally practiced in the presence of a solvent although the reaction may be carried out without any solvent in some instances. Any solvent can be used insofar as the solvent does not impair the reaction and as long as water can be removed efficiently, when the reaction is conducted while taking water out of the reaction system. Examples of such a solvent include aliphatic or alicyclic hydrocarbons such as n-hexane, n-pentane, n-heptane and cyclohexane; aromatic hydrocarbons such as benzene, toluene, xylene, ethylbenzene and cumene; halogenated, aliphatic or aromatic compounds such as dichloromethane, chloroform, chlorobenzene and dichlorobenzene; ethers such as diethyl ether, di(n-butyl) ether, diphenyl ether, tetrahydrofuran and ethylene glycol diethyl ether; alcohols such as methanol, ethanol, benzyl alcohol, isopropyl alcohol, cyclohexanol, tert-butanol, tert-amyl alcohol and propylene glycol; ketones such as acetone, ethyl methyl ketone and acetophenone; esters such as ethyl acetate and ethyl propionate; carbonates such as dimethyl carbonate; and aromatic nitro compounds such as nitrobenzene. They can be used either singly or in combination. Further, when these solvents are used, it does not matter whether the reaction mixture forms a homogeneous single phase or heterogeneous plural phases. Of these solvents, preferred are secondary alcohols such as isopropyl alcohol, 2-butyl alcohol, 4-methyl-2-pentanol and cyclohexanol as well as tertiary alcohols such as tert-butanol, tert-amyl alcohol, 2-phenyl-2-propanol and 1-methylcyclohexanol.

The organic hydroperoxide or an indole compound as a raw material in the present invention or a solvent, when employed, may contain water, for example, for the following reasons. When the organic hydroperoxide is prepared, for example, in a two phase system of water and an organic solvent by the emulsification process, the organic hydroperoxide is obtained as a solution in the organic solvent by separating the solution from a water phase. Mixing of water is unavoidable at this time. Available organic hydroperoxides (for example, tertiary butyl hydroperoxide and the like) are often furnished as aqueous solutions. Further, solvents which azeotropically evaporate together with water are often available as azeotropic mixtures. Use of such water-containing raw materials and/or solvent will result in the introduction of water into the reaction system. In addition, water is produced by oxidative dehydration upon formation of the indigo compound from the corresponding indole compound in the present reaction, so that the water content in the reaction system increases as the reaction proceeds.

In the process of the present invention, the raw materials are reacted while taking out water from the reaction system, said water being that introduced in the reaction system and formed during the reaction. Compared to the reaction without such water removal, the yield and the reaction velocity of the indigo compound are improved. Even if some water is contained in the raw materials for the present invention and in the solvent, when employed, they can be subjected to the reaction without any drying operation in advance. As a method for taking out water from the system while allowing the raw materials to react, any method can be employed as long as water can be taken out effectively without impairing the reaction. In general, eliminating of water by evaporation or membrane separation is used. Of these, it is preferable to eliminate water by evaporation. Elimination methods of water by evaporation include, for example, (1) conventional distillation in which a fraction composed primarily of water is distilled off and (2) azeotropic distillation in which an azeotropic mixture of at least two components including at least water, namely, an azeotropic mixture of water and one or more components contained in the reaction system is distilled. Examples of components contained in the reaction system include the solvent and those formed as a result of conversion of the solvent or raw materials during the reaction. In some instance, a solvent different from that used upon initiation of the reaction may be added and distilled off together with water in the course of the reaction. A mixture, which has been taken out from the reaction system by such a water elimination method, may be returned to the reaction system after separating off at least water by a suitable method such as distillation, use of a drying agent or removing water layer from the mixture when it forms plural phases. As an alternative, a fresh solvent or the like of either a different or the same kind can be added to the reaction system. These operations can be conducted through the entire period of the reaction or during a part of the period of the reaction, either continuously or intermittently. When the raw materials are reacted while taking out water from the reaction system, said water being that introduced in the reaction system and formed during the reaction, it is only necessary to remove water to such an extent that the reaction is not impaired. It is unnecessary to completely remove water contained in the reaction system.

Further, in the process of the present invention, the reaction can be carried out without removal of water from the reaction system in the course of the reaction, provided that water introduced into the reaction system is reduced in advance by using raw materials and, where employed, a solvent and/or an additive which have been subjected to conventional drying, for example, by using a drying agent, distilling off water, removing water as an azeotropic mixture or separating water through a membrane. Drying can be applied independently to the raw materials, the solvent and the additive. Alternatively, drying can also be applied to their mixture under conditions not initiating the reaction. It is sufficient if the amount of water to be introduced into the reaction system is reduced to such an extent as not impairing the reaction. Preferably, the water to be introduced into the reaction system is not greater than 1 mole per mole of the indole compound.

In the process of the present invention, ht is also possible to reduce water in advance, which is to be introduced into the reaction system, to a level not greater than 1 mole per mole of the indole compound and then to conduct the reaction while taking out water from the reaction system, the latter water being the water introduced into the reaction system and that produced during the reaction.

It is preferable to use an organic carboxylic acid as an additive in the process of the present invention, because the yield and formation velocity of the indigo compound can be improved further. Illustrative examples of such an organic carboxylic acid include aliphatic carboxylic acids such as acetic acid, propionic acid, stearic acid, phenylacetic acid, oleic acid and cinnamic acid; and aromatic carboxylic acids such as benzoic acid, paramethylbenzoic acid, metachlorobenzoic acid and parahydroxybenzoic acid. Of these, acetic acid, propionic acid and benzoic acid are preferred.

It is also effective to add, as an additive, an organic silanol such as trimethylsilanol, triethyl-silanol and triphenylsilanol. Further, to improve the yield and formation velocity of the indigo compound, a further additive other than those mentioned above can be used. Plural kinds of additives may also be used in combination.

No particular limitation is imposed on the method for practicing the reaction in the process of the present invention. Any method can be used as long as the indole compound, organic hydroperoxide and catalyst and, where employed, the solvent and the additive can be effectively mixed and contacted with each other and, when they are reacted while taking out water from the reaction system, they can be reacted while effectively removing water from the reaction system. The reaction can be conducted by a batchwise method, a semibatchwise method or a continuous flow method.

The reaction temperature varies depending on the kinds and amounts of the raw materials, i.e., of the indole compound, organic hydroperoxide and catalyst and, where employed, the solvent and the additive and, where they are reacted while taking out water from the reaction system, depending on the manner of water removal. In general, the reaction temperature, however, may range from $-10°$ C. to $200°$ C., preferably from $10°$ C. to $150°$ C., more preferably from $40°$ C. to $110°$ C. The reaction time is generally 50 hours or shorter, preferably in a range of from 0.01 hour to 20 hours. The reaction can be practiced under reduced pressure, normal pressure or elevated pressure. According to the process of the present invention, the reaction can be carried out either under an inert gas atmosphere or in the presence of molecular oxygen such as air. When the reaction is carried out while taking out water from the reaction system, the reaction can be conducted while feeding such a gas into the reaction system to permit effective removal of water.

In the process of the present invention, the indigo compound can be obtained by treating the reaction mixture by a conventional method after the completion of the reaction. In general, a majority of the resultant indigo compound is present as a precipitate after the completion of the reaction. The indigo compound can therefore be easily collected as a solid matter by a conventional solid-liquid separation procedure such as filtration, centrifugation or decantation. If the precipitated amount of the indigo compound is insufficient, the reaction mixture can be concentrated to have the indigo compound precipitated in a greater amount, followed by the collection of the indigo compound so precipitated.

The indigo compound obtained by the process of the present invention corresponds to the indole compound employed as a raw material and contains the same substituent or substituents at the same position or positions on the aromatic ring and/or nitrogen atom of the indole compound as the raw material.

The present invention will hereinafter be described more specifically by the following examples, which are presented merely to illustrate the invention and shall not be taken as limiting the scope of the present invention.

Preparation of a cumene solution of
1-methyl-1-phenyl-ethyl hydroperoxide (common name: cumene hydroperoxide)

The preparation and purification were performed by the procedure described in "Synthesis of Organic Compound, Vol.11"pp.35-36 ed. by The Society of Synthetic Organic Chemistry, Japan, Gihoudo.

In a four-necked 5l-flask equipped with a stirrer, a gas blowing inlet and a gas outlet having a reflux condenser and a thermometer, 4.0 g of caustic soda, a 2.5 l aqueous solution of 29 g of borax and, as an emulsifier, 2.5 g of sodium stearate were charged and heated over water bath. After the emulsifier was dissolved completely, 1.25 l of a cumene solution containing 2 wt. % of cumene hydroperoxide were added to the resulting solution. When the internal temperature had reached 85° C., blowing of oxygen was started at a rate of 50 l/hour under vigorous stirring. After the contents were allowed to react for 9 hours, the reaction mixture was cooled down to room temperature, followed by the continuous blowing of $CO_2$ until the turbidity of the water layer became unchanged. The reaction mixture then separated into two layers. The lower water layer was discarded and upper layer was washed once with 250 ml of water, whereby 1260 ml of a cumene solution containing 34.09 wt. % of cumene hydroperoxide [hereinafter abbreviated as "CHP solution (a)"]were obtained. As a result of an analysis by the Karl-Fisher method, the water content of the solution was found to be 0.92 wt. %.

Anhydrous sodium sulfate (400 g) was added to 1050 ml of the CHP solution (a) obtained above to dry the latter overnight, whereby 1030 ml of a cumene solution containing 34.25 wt. % of cumene hydroperoxide [hereinafter abbreviated as "CHP solution (b)"]were obtained. The water content of the solution was found to be 0.13 wt. %.

The CHP solution (b) (820 ml) was charged together with 3 g of finely-ground anhydrous sodium carbonate in a 2-l ground glass evaporator. While air was being blown into the evaporator, low-boiling-point components were distilled off under reduced pressure and heating over a boiling water bath so that 290 ml of a cumene solution containing 82.01 wt. % of cumene hydroperoxide [hereinafter abbreviated as "CHP solution (c)"]were obtained as a residue. The water content of the solution was 0.04 wt. %.

EXAMPLE 1

In a three-necked 500-ml flask equipped with a stirrer, a thermometer and a reflux condenser, 10.0 g (85.4 mmol) of indole, 22.5 mg (0.085 mmol) of molybdenum hexacarbonyl as a catalyst, 300 g of cumene as a solvent and 79.2 g (426.8 mmol in terms of cumene hydroperoxide) of the CHP solution (c) as an organic hydroperoxide were charged at once. Although no water was detected from indole and molybdenum hexacarbonyl, cumene contained 0.026 wt. % of water. Accordingly, the quantity of the water introduced into the reaction system, including the water contained in the CHP solution (c) and in cumene, was totally 0.11 g (6.1 mmol), which corresponded to 0.07 mole per mole of indole. The solution thus prepared was heated to 100° C. over oil bath and reacted for 5 hours with stirring under an air atmosphere. The solution was homogeneous at the beginning of the reaction, but a deep-blue solid matter was increasingly observed with the progress of the reaction. After the completion of the reaction, the reaction mixture was filtered. The solid matter was washed with small quantities of cumene and methanol and then dried at 50° C. under reduced pressure, whereby 6.29 g of a deep-blue solid matter were obtained. As a result of elemental and IR analyses, the solid matter was proved to be indigo. The molar yield of the isolated indigo based on the charged indole (hereinafter simply abbreviated as "the yield of indigo") was 56.2%, and the hourly yield of indigo as an indication for the formation velocity of indigo was 11.2%.

EXAMPLE 2

A reaction was conducted in a similar manner to Example 1 except that 189.7 g (426.9 mmol in terms of cumene hydroperoxide) of the CHP solution (b) were used instead of the CH solution (c) and the quantity of cumene was changed to 189.5 g to make its total quantity equal to that in Example 1. The quantity of the water introduced into the reaction system, including the water contained in the CHP solution (b) and in cumene, was 0 30 g (16.7 mmol), which corresponded to 0.20 mole per mole of indole. The reaction mixture thus obtained was subjected to post-treatment in a similar manner to Example 1, whereby 6.08 g of indigo were obtained. The yield of indigo was 54.3% and the hourly yield of indigo was 10.9%.

COMPARATIVE EXAMPLE 1

A reaction was conducted in a similar manner to Example 1 except that 190.6 g (426.9 mmol in terms of cumene hydroperoxide) of the CHP solution (a) were used instead of the CHP solution (c) and the quantity of cumene was changed to 188.6 g to make its total quantity equal to that in Example 1. The quantity of the water introduced into the reaction system, including the water contained in both the CHP solution (a) and cumene, was 1.80 g (100.2 mmol), which corresponded to 1.17 moles per mole of indole. The reaction mixture thus obtained was subjected to post-treatment in a similar manner to Example 1, whereby 5.35 g of indigo were obtained. The yield of indigo was 47.8% and the hourly yield of indigo was 9.6%. The more the quantity of water introduced into the reaction system, the lower the yield and the lower the formation velocity.

EXAMPLE 3

After 100 g of "Perbutyl H-69T" (trade name; product of Nippon Oils & Fats Co., Ltd.), which is a toluene solution containing 68.7 wt. % of tert-butyl hydroperoxide and 2.8 wt. % of water, were diluted with 200 g of toluene, 100 g of anhydrous sodium sulfate were added to dry the former overnight. Molecular Sieves 4A (100 g) was then added to the resulting solution to dry the solution overnight, whereby 291.4 g of a toluene solution containing 21.6 wt. % of tert-butyl hydroperoxide were obtained. The water content of the solution was 0.01 wt. %.

In a four-necked 500-ml flask equipped with a stirrer, a thermometer, a dropping funnel and a reflux condenser, 10.0 g of indole (85.4 mmol), 225.4 mg (0.85 mmol) of molybdenum hexacarbonyl as a catalyst and, as a solvent, 153.3 g of toluene containing 0.016 wt. % of water were charged. The mixture was heated to 80° C. over oil bath. While the resulting mixture was being stirred under an air atmosphere, as an organic hydroperoxide the above-prepared toluene solution containing 21.6 wt. % of tert-butyl hydroperoxide was added dropwise over one hour through a dropping funnel in an amount of 213.9 g (512.7 mmol of tertiary butyl hydroperoxide) of tert-butyl hydroperoxide. The resultant mixture was reacted for 5 hours. The quantity of the water introduced into the reaction system was 0.046 g (2.6 mmol) in total, which corresponded to 0.03 mole per mole of indole. After the completion of the reaction, the reaction mixture was filtered. The resulting solid matter was washed with small quantities of toluene and methanol and then dried at 50° C. under reduced pressure, whereby 5.69 g of indigo were obtained. The yield of indigo was 50.8%, while the hourly yield of indigo was 10.2%.

COMPARATIVE EXAMPLE 2

A reaction was conducted in a similar manner to Example 3 except that the toluene solution containing 21.6 wt. % of tert-butyl hydroperoxide was replaced by 67.2 g (512.3 mmol in terms of tert-butyl hydro-peroxide) of an undried toluene solution containing 68.7 wt. % of tert-butyl hydroperoxide and 2.8 wt. % of water mentioned above, and the quantity of toluene was changed to 300 g to make its total quantity equal to that in Example 3. The quantity of the water introduced into the reaction system, including the water contained in both toluene and the toluene solution of tert-butyl hydroperoxide, was 1.93 g (107.2 mmol), which corresponded to 1.26 moles per mole of indole. The reaction mixture thus obtained was subjected to post-treatment in a similar manner to Example 3, whereby 4.93 g of indigo were obtained. The yield of indigo was 44.0%, while the hourly yield of indigo was 8.8%. Similarly to Comparative Example 1, the more the quantity of water introduced into the reaction system, the lower the yield of indigo and the formation velocity.

COMPARATIVE EXAMPLE 3

A reaction was conducted in a similar manner to Example 3 except that the toluene solution containing 21.6 wt. % of tert-butyl hydroperoxide in toluene was replaced by 67.7 g (512.3 mmol in terms of tert-butyl hydroperoxide) of "Perbutyl H-68"(trade name; product of Nippon Oils & Fats Co., Ltd.), which is a 68.2 wt. % aqueous solution of tert-butyl hydroperoxide, and the quantity of toluene was changed to 315.7 g so that the total quantity of toluene charged was made equal correspondingly to that in Example 3. "Perbutyl H-68" of Nippon Oils & Fats had a water content of 27.9 wt. %. The quantity of the water introduced into the reaction system, including the water contained in toluene and in the hydroperoxide solution, was 18.94 g (1052 mmol), which corresponded to 12.3 moles per mole of indole. The reaction mixture thus obtained was subjected to post-treatment in a similar manner to that in Example 3, whereby 2.68 g of indigo were obtained. The yield of indigo was 23.9%, while the hourly yield of indigo was 4.8%. The quantity of water introduced into the reaction system was greater than that in Comparative Example 2, resulting in the reduced yield of indigo and the lowered formation velocity.

EXAMPLE 4

In a three-necked 300-ml flask equipped with a stirrer, a thermometer and a reflux condenser, 10.0 g (85.4 mmol) of indole, 136.5 mg (0.085 mg atom in terms of a molybdenum metal) of toluene solution of molybdenum naphthenate (containing 6 wt. % in terms of molybdenum metal) as a catalyst, 0.51 g (8.5 mmol) of acetic acid as an additive, 150 g of tertiary-butanol as a solvent and, as an organic hydroperoxide, 34.86 g (187.8 mmol in terms of cumene hydroperoxide) of "Percumyl H-80" (trade name; product of Nippon Oils & Fats Co., Ltd.), which is a cumene solution containing 82.0 wt. % of cumene hydroperoxide and will hereinafter be called as "CHP solution (d)", were charged at once. No water was detected from the toluene solution of molybdenum naphthenate, however, tert-butanol and the CHP solution (d) had a water content of 0.05 wt. % and 0.04 wt. %, respectively. Accordingly, the quantity of the water introduced into the reaction system was 0.089 g (4.9 mmol) in total, which corresponded to 0.06 mole per mole of indole. The resulting solution mixture was heated over oil bath under reflux and reacted for 7 hours with stirring under an air atmosphere. The temperature of the solution mixture was 86.5° C. at the beginning of the reaction, which was decreased to 84.8° C. after 5 hours. After the completion of the reaction, the reaction mixture was filtered. The resulting solid matter was washed with a small quantity of tert-butanol and then dried at 50° C. under reduced pressure, whereby 8.90 g of indigo were obtained. The yield of indigo was 79.5 %, while the hourly yield of indigo was 11.4%.

COMPARATIVE EXAMPLE 4

A reaction was conducted in a similar manner to Example 4 except that tert-butanol was replaced by 150 g of water-containing tert-butanol, which was an azeotropic mixture composed of 88.24 wt. % of tertbutanol and 11.76 wt. % of water. The quantity of the water introduced into the reaction system, including the water contained in both the CHP solution (d) and the water-containing tert-butanol, was 17.65 g (980.6 mmol), which corresponded to 11.5 moles per mole of indole. The reaction mixture thus obtained was subjected to post-treatment in a similar manner to that of Example 4, whereby 4.39 g of indigo were obtained. The yield of indigo was 39.2%, while the hourly yield of indigo was 5.6%. Similarly to other comparative examples, the greater the quantity of the water introduced into the reaction system, the lower the yield of indigo and the lower the formation velocity.

EXAMPLES 5-7 AND COMPARATIVE EXAMPLE 5

It is apparent from Example 4 and Comparative Example 4 that the yield of indigo and the reaction velocity are markedly affected by the quantity of water introduced into a reaction system. A reaction and post-treatment were, therefore, conducted in a similar manner to Example 4 except that water was added further in the quantity shown in Table 1, whereby the tolerable quantity of water introduced into the reaction system was studied. The results are shown in Table 1, together with the results of Example 4 and Comparative Example 4. As is envisaged from the results, when the quantity of the water introduced into the reaction system was controlled below one mole per mole of indole employed, indigo was obtained in a high yield and also at a high formation velocity.

TABLE 1

| No. | Water content added g | Water content added mmol | Total quantity of water introduced into reaction system g | Total quantity of water introduced into reaction system mmol | Total quantity of water introduced into reaction system molar ratio to indole | Yield of indigo (%) | Hourly yield of indigo (%) |
|---|---|---|---|---|---|---|---|
| Ex. 4 | 0.00 | 0.0 | 0.089 | 4.9 | 0.06 | 79.5 | 11.4 |
| Ex. 5 | 0.062 | 3.4 | 0.151 | 8.4 | 0.10 | 79.3 | 11.3 |
| Ex. 6 | 0.215 | 11.9 | 0.304 | 16.9 | 0.20 | 78.3 | 11.2 |
| Ex. 7 | 1.018 | 56.6 | 1.107 | 61.5 | 0.72 | 77.4 | 11.1 |
| Comp. Ex. 5 | 3.385 | 188.1 | 3.474 | 193.0 | 2.26 | 69.1 | 9.9 |
| Comp. Ex. 4 | — | — | 17.65 | 980.6 | 11.5 | 39.2 | 5.6 |

EXAMPLE 8

A reaction and post-treatment were conducted in a similar manner to Example 1 except that 1.04 g (8.5 mmol) of benzoic acid were added further as an additive, whereby indigo was obtained in 66.1% yield and in 13.2% hourly yield.

EXAMPLE 9

A reaction and post-treatment were conducted in a similar manner to Example 1 except that 2.36 g (8.5 mmol) of triphenylslanol was added further as an additive, whereby indigo was obtained in 63.4% yield and 12.7% hourly yield.

EXAMPLE 10

A reaction and post-treatment were conducted in a similar manner to Example 1 except that 1.04 g (8.5 mmol) of benzoic acid and 2.36 g (8.5 mmol) of triphenylsilanol were added further as additives, whereby indigo was obtained in 72.8% yield and 14.6% hourly yield.

EXAMPLE 11

A reaction was conducted in a similar manner to Example 4 except that the toluene solution of molybdenum naphthenate was replaced by 27.7 mg (0.085 mmol) of molybdenum dioxyacetylacetonate, tert-butanol was replaced by 150 g of isopropyl alcohol, acetic acid was not added and the reaction time was changed to 5 hours. No water was detected from molybdenum dioxyacetylacetonate, while isopropyl alcohol had a water content of 0.03 wt. %. Accordingly, the quantity of the water introduced into the reaction system, including the water contained in the CHP solution (d) and in the solvent was 0.059 g (3.3 mmol), which corresponded to 0.04 mole per mole of indole. After the completion of the reaction, the reaction mixture was filtered. The resulting solid matter was washed with a small quantity of isopropyl alcohol and thereafter dried at 50° C. under reduced pressure, whereby indigo was obtained in 72.2% yield and 14.4% hourly yield.

COMPARATIVE EXAMPLE 6

A reaction was conducted in a similar manner to Example 11 except that isopropyl alcohol was replaced by 150 g of water-containing isopropyl alcohol (an azeotropic mixture composed of 87.4 wt. % of isopropyl alcohol and 12.6 wt. % of water). The quantity of the water introduced into the reaction system, including the water contained in both the CHP solution (d) and the water-containing isopropyl alcohol, was 18.91 g (1051 mmol), which corresponded to 12.3 moles per mole of indole. The resulting reaction mixture was subjected to post-treatment in a similar manner to Example 11, whereby indigo was obtained in 26.6% yield and 5.3% hourly yield. Similarly to other comparative examples, the greater the quantity of the water introduced into the reaction system, the lower the yield and the lower the formation velocity.

EXAMPLE 12

A reaction was conducted in a similar manner to Example 4 except that the toluene solution of molybdenum naphthenate was replaced by 241.6 mg (0.85 mmol) of solid isopropyl orthotitanate, tert-butanol was replaced by 75 g of tert-amyl alcohol, the reaction temperature was changed to 100° C. and the reaction time was changed to 5 hours. No water was detected from isopropyl orthotitanate, while tert-amyl alcohol had a water content of 0.05 wt. %. Accordingly, the quantity of the water introduced into the reaction system, including the water contained in the CHP solution (d) and in the solvent, was 0.052 g (2.9 mmol), which corresponded to 0.03 mole per mole of indole. After the completion of the reaction, the reaction mixture was filtered. The resulting solid matter was washed with small quantities of tert-amyl alcohol and methanol and then dried at 50° C. under reduced pressure, whereby indigo was obtained in 10.6% yield and 2.1% hourly yield.

COMPARATIVE EXAMPLE 7

A reaction was conducted in a similar manner to Example 12 except that tert-amyl alcohol was replaced by 75 g of water-containing tert-amyl alcohol (an azeotropic mixture composed of 72.5 wt. % of tert-amyl alcohol and 27.5 wt. % of water). The quantity of the water introduced into the reaction system, including the water contained in both the CHP solution (d) and the water-containing tert-amyl alcohol was 20.64 g (1147 mmol), which corresponded to 13.4 moles per mole of indole. The reaction mixture was subjected to post-treatment in a similar manner to Example 12, whereby indigo was obtained in 0.6 % yield and 0.1% hourly yield. Similarly to other comparative examples, the greater the quantity of the water introduced into the reaction system, the lower both the yield and the formation velocity.

EXAMPLE 13

A reaction was conducted in a similar manner to Example 4 except that indole was replaced by 6.48 g (42.7 mmol) of 5-chloroindole and the quantity of the CHP solution (d) was changed to 23.78 g (128.1 mmol in terms of cumene hydroperoxide). No water was detected from 5-chloroindole. Accordingly, the quantity of the water introduced into the reaction system, including the water contained in both the CHP solution (d) and tert-butyl alcohol was 0.085 g (4.7 mmol), which corresponded to 0.11 mole per mole of 5-chloroindole. After the completion of the reaction, the reaction mixture was filtered. The resulting solid matter was washed with a small quantity of methanol and thereafter dried at 50° C. under reduced pressure, whereby 5.40 g of 5,5'-dichloroindigo, which is an indigo compound corresponding to 5-chloroindole, was obtained. The molar yield of the 5,5'-dichloroindigo obtained was 76.3% based on the 5-chloroindole charged and the hourly yield of 5,5'-dichloroindigo was 10.9%.

EXAMPLE 14

A reaction was conducted in a similar manner to Example 4 except that indole was replaced by 22.41 g (170.8 mmol) of 6-methylindole and the quantity of the CHP solution (d) was changed to 95.11 g (512.4 mmol in terms of cumene hydroperoxide). No water was detected from 6-methylindole. Accordingly, the quantity of the water introduced into the reaction system, including the water contained in both the CHP solution (d) and tert-butyl alcohol was 0.113 g (6.3 mmol), which corresponded to 0.04 mole per mole of 6-methylindole. After the completion of the reaction, the reaction mixture was filtered. The resulting solid matter was washed with a small quantity of methanol and then dried at 50° C. under reduced pressure, whereby 16.77 g of 6,6'-dimethylindigo, which is an indigo compound corresponding to 6-methylindole, was obtained. The molar yield of the 6,6'-dimethylindigo obtained was 68.1% based on the 6-methylindole charged and the hourly yield of 6,6'-dimethylindigo was 9.7%.

EXAMPLE 15

A four-necked 500-ml flask equipped with a stirrer, a thermometer, a dropping funnel and a Dean-Stark water separator, said Dean-Stark water separator being fitted with a reflux condenser on an upper part thereof, was provided. The Dean-Stark water separator is a device as shown in FIG. 12 on page 382 of Organic Synthesis, Col. Vol. III, and is designed to retain a distillate, which has been liquefied by the reflux condenser in a water separator so that the distillate separates into layers and the liquid having a smaller specific gravity (i.e. upper layer) is returned to a reaction flask. In the above-described four-necked flask, 10.0 g (85.4 mmol) of indole, 1.356 g (0.85 mg atom in terms of molybdenum metal) of a toluene solution of molybdenum naphthenate (containing 6 wt. % in terms of molybdenum metal) as a catalyst and 300 g of toluene as a solvent were charged. The resulting mixture was heated under stirring over oil bath of 95° C. When the temperature of the reaction mixture had increased to 90.C, dropwise addition of 67.7 g (512.3 mmol in terms of tert-butyl hydroperoxide) of an aqueous solution of tert-butyl hydroperoxide (containing 68.2 wt. % of tert-butyl hydroperoxide) was started through the dropping funnel. After the whole quantity was added dropwise over one hour, the contents were allowed to react for 5 hours. The quantity of the water introduced accompanying with both the starting materials and the solvent was 14.0 moles per mole of indole. Right after the initiation of the dropwise addition, reflux began. In the Dean-Stark water separator, water, which had flowed out together with toluene as a result of azeotropy, gradually increased as a separated lower layer. The upper toluene layer was continuously returned to the reaction system. The reaction was continued in this manner while discarding water to the outside of the reaction system. After the completion of the reaction, the reaction mixture was filtered. The resulting solid matter was washed with small quantities of toluene and methanol and then dried at 50° C. under reduced pressure, whereby 5.03 g of a deep-blue solid matter were obtained. The yield of indigo was 44.9%, while the hourly yield of indigo was 8.98%.

EXAMPLE 16

A five-necked 500-ml flask was equipped with a stirrer, a thermometer, two dropping funnels and a connector tube with downwardly-extending side arm. The connector tube was fitted with a thermometer at an upper part thereof and also with a Liebig condenser at an outlet of the side arm, and a receptacle was provided at an outlet of the condenser. In the five-necked flask, indole, toluene and a toluene solution of molybdenum naphthenate, each in the same quantity as that in Example 15, were charged. The quantity of the water introduced into the reaction system was equal to that in Example 15. The resulting mixture was heated under stirring over oil bath of 95° C. When the temperature of the mixture had reached 90° C., dropwise addition of a 68.7 wt. % aqueous solution of tert-butyl hydroperoxide as an organic hydroperoxide in the same quantity as that in Example 15 was initiated through one of the dropping funnels. After the whole quantity was added dropwise over one hour, the contents were allowed to react for 5 hours. Similarly to Example 15, reflux started immediately after the initiation of the dropwise addition. The distillate condensed by the Liebig condenser was all received in the receptacle. In the receptacle, the distillate separated into two layers, that is, a water layer and a toluene layer. Whenever toluene accumulated to 10 ml in the receptacle, 10 ml of fresh toluene were added dropwise into the reaction system through the other dropping funnel. The reaction was continued while taking out water from the reaction system. After the completion of the reaction, the reaction mixture was subjected to post-treatment in a similar manner to Example 15, whereby 5.17 g of indigo were obtained. The yield of indigo was 46.2%, while the hourly yield of indigo was 9.24%.

COMPARATIVE EXAMPLE 8

In a four-necked flask equipped with a stirrer, a thermometer, two dropping funnels and a reflux condenser, indole, toluene and a toluene solution of molybdenum naphthenate, each in the same quantity as that in Example 15, were charged. The quantity of the water introduced into the reaction system was equal to that in Example 15. The resulting mixture was heated under stirring over oil bath of 95° C. When the temperature of the reaction mixture was increased to 90° C., the dropwise addition of a 68.7 wt. % aqueous solution of tert-butyl hydroperoxide in the same quantity as that in Example 15 was started through one of the two dropping funnels. The whole quantity was added dropwise over one hour and the contents were allowed to react for 5 hours. Similarly to Examples 15 and 16, reflux started right after the initiation of the dropwise addition. The distillate condensed by the reflux condenser was returned directly to the reaction system. The reaction was continued in this manner without discarding water to the outside of the reaction system. After the completion of the reaction, the reaction mixture was subjected to post-treatment in a similar manner to Example 15, whereby 2.84 g of indigo were obtained. The yield of indigo was 25.4% and the hourly yield of indigo was 5.08%. When the reaction was carried out without taking out water from the reaction system, the yield was low and the formation velocity was slow.

EXAMPLE 17

A four-necked 300-ml flask was equipped with a stirrer, a thermometer, a dropping funnel and a connector tube with downwardly-extending side arm. The connector tube was fitted with a thermometer on at an upper part thereof and a Liebig condenser at an outlet of the side arm, and a receptacle was provided at an outlet of the condenser. In the above-described four-necked flask, 10.0 g (85.4 mmol) of indole, 28.0 mg (0.085 mmol) of molybdenum dioxyacetylacetonate as a catalyst, 150 g of water-containing tert-butanol (an azeotropic mixture composed of 88.24 wt. % of tertbutanol and 11.76 wt. % of water) as a solvent and 34.86 g (187.8 mmol in terms of cumene hydroperoxide) of the CHP solution (d) as an organic hydroperoxide were charged at once. The quantity of the water contained in both the starting material and the solvent were 11.5 moles per mole of indole. The resulting mixture was heated under stirring over oil bath of 95° C. The mixture continued refluxing during the reaction and the liquid condensed by the Liebig condenser all distilled out. The resulting distillate was homogeneous and did not separate into two layers. As a result of an analysis, it was found that the distillate contained water. Whenever the distillate accumulated to 10 ml in the receptacle, it was discarded and 10 ml of water-free tert-butanol was added dropwise to the reaction system through the dropping funnel. The reaction was thus conducted for 7 hours while discarding water to the outside of the reaction system. After the completion of the reaction, the reaction mixture was filtered. The resulting solid matter was washed with tert-butanol and then dried at 50° C. under reduced pressure, whereby 5.75 g of indigo were obtained. The yield of indigo was 51.4% and the hourly yield of indigo was 7.34%.

COMPARATIVE EXAMPLE 9

In a three-necked flask equipped with a stirrer, a thermometer and a reflux condenser, indole, molybdenum dioxyacetylacetonate, water-containing tert-butanol and the CHP solution (d), each in the same quantity as that in Example 17, were charged at once. The quantity of the water introduced into the reaction system was equal to that in Example 17. The resulting mixture was heated under stirring over oil bath of 95° C. Similarly to Example 17, the reaction mixture continued refluxing during reaction. The liquid condensed by the reflux condenser was all returned directly to the reaction system. Thus, the reaction was continued for 7 hours without taking out water from the reaction system. After the completion of the reaction, the reaction mixture was subjected to post-treatment in a similar manner to Example 17, whereby 3.64 g of indigo were obtained. The yield of indigo was 32.5%, while the hourly yield of indigo was 4.64%. When the reaction was conducted without discarding the water present to the outside of the reaction system, the yield was low and the formation velocity was slow.

EXAMPLE 18

A three-necked 300-ml flask was equipped with a stirrer, a thermometer and a Dean-Stark water separator. Further, the Dean-Stark water separator was fitted with a reflux condenser on an upper part thereof. In the three-necked flask, 10.0 g (85.4 mmol) of indole, 241.6 mg (0.85 mmol) of isopropyl orthotitanate as a catalyst, 150 g of water-containing isopropyl alcohol (an azeotropic mixture composed of 87.4 wt. % of isopropyl alcohol and 12.6 wt. % of water) and 15 g of benzene as solvents and 45.0 g (426.8 mmol in terms of cumene hydroperoxide) of the CHP solution (d) were charged at once. The quantity of the water contained in both the starting materials and the solvent was 12.3 moles per mole of indole. The resulting mixture was heated under stirring over oil bath of 95° C. The reaction mixture continued refluxing during the reaction. In the Dean-Stark water separator, azeotropic distillate consisting of water, isopropyl alcohol and benzene separated into two layers and the water gradually increased as the lower layer. The upper organic layer was returned continuously into the reaction system. Thus, the reaction was continued for 7 hours while discarding the water to the outside of the reaction system. After the completion of the reaction, the reaction mixture was filtered. The resulting solid matter was washed with a small quantity of isopropyl alcohol and then dried at 50° C. under reduced pressure, whereby 1.02 g of indigo were obtained. The yield of indigo was 9.1% and the hourly yield of indigo was 1.3%.

COMPARATIVE EXAMPLE 10

In a three-necked 300-ml flask equipped with the same units as those in Example 18, indole, isopropyl orthotitanate, water-containing isopropyl alcohol and the CHP solution (d), each in the same quantity as that in Example 18, were charged, though benzene was not added at all. The mixture was heated over oil bath of 95° C. with stirring under an air atmosphere. The quantity of the water introduced into the reaction system was equal to that in Example 18. Similarly to Example 18, the reaction mixture continued refluxing during the reaction. The distillate was homogeneous in the Dean-Stark water separator and did not separate into two layers. The distillate was returned to the reaction system directly. Thus, the reaction was continued for 7 hours without discarding the water to the outside. After the completion of the reaction, the reaction mixture was subjected to post-treatment in a similar manner to Example 18, whereby indigo was obtained. The yield of indigo was 0.5%, while the hourly yield of indigo was 0.07%. When the reaction was carried out without taking out water from the reaction system, the yield was low and the formation velocity was slow.

EXAMPLE 19

A five-necked 300-ml flask was equipped with a stirrer, a thermometer, two dropping funnels and a connector tube with downwardly-extending side arm. Further, the connector tube was fitted with a thermometer on an upper part thereof and a Liebig condenser at an outlet of the side arm, and a receptacle was provided at an outlet of the condenser. In the above-described five-necked flask, 10.0 g of indole (85.4 mmol), 67.6 mg (0.256 mmol) of molybdenum hexacarbonyl as a catalyst, 2.08 g (17.0 mmol) of benzoic acid as an additive and, as a solvent, 150 g of dry tert-butanol were charged at once. The mixture was heated under stirring over oil bath of 95.C When the mixture started refluxing, the dropwise addition with 40.5 g (218.2 mmol in terms of cumene hydroperoxide) of a cumene solution containing 82.0 wt. % of cumene hydroperoxide as an organic hydroperoxide was started through one of two dropping funnels. After the whole quantity was added dropwise over one hour, the content were allowed to react for 7 hours. Tert-butanol and cumene solution of cumene hydroperoxide contained 0.05 wt. % and 0.5 wt. % of water, respectively. Accordingly, the quantity of the water introduced into the reaction system, including the water contained in both tertbutanol and the cumene solution of cumene hydroperoxide was 0.278 g (15.4 mmol), which corresponded to 0.18 mole per mole of indole. The reaction mixture continued refluxing from the initiation of the dropwise addition of the cumene solution of cumene hydroperoxide until the completion of the reaction. The distillate condensed by the Liebig condenser did not separate into layers and was collected in the receptacle as a homogeneous liquid. As an analysis, it was found that the distillate contained water. Whenever the distillate accumulated to 10 ml in the receptacle, it was discarded and 10 ml of flesh tert-butanol was added dropwise to the reaction system through the other dropping funnel. After the completion of the reaction, the reaction mixture was filtered. The resulting solid matter was washed with tert-butanol and then dried at 50° C. under reduced pressure, whereby 8.80 g of indigo was obtained. The yield of indigo was 78.6% and the hourly yield of indigo was 11.23%.

EXAMPLE 20

A three-necked 500-ml flask equipped with a stirrer, a thermometer and a Dean-Stark water separator, said water separator being fitted with a reflux condenser on an upper part thereof and said reflux condenser being connected with a pressure reduction line at an upper outlet thereof, was provided. In the above-described three-neck flask, 10.0 g (85.4 mmol) of indole, 22.5 mg (0.085 mmol) of molybdenum hexacarbonyl as a catalyst, 300 g of cumene as a solvent and, as an organic hydroperoxide, 52.3 g (281.7 mmol in terms of cumene hydroperoxide) of the CHP solution (d) were charged at once. The cumene contained 0.026 wt. % of water. Accordingly, the quantity of the water introduced into the reaction system, including the water contained in both the solvent and the CHP solution (d) was 0.099 g (5.5 mmol), which corresponded to 0.06 mole per mole of indole. The mixture was heated to 100° C. over oil bath under stirring. The pressure inside the reaction system was maintained at 180 mmHg. The reaction mixture continued refluxing during the reaction. In the Dean-Stark water separator, an azeotropic mixture separated into water layer and cumene layer. The lower water layer increased with proceeding the reaction. The upper cumene layer was returned to the reaction system. Thus, the reaction was conducted for 5 hours. After the completion of the reaction, the reaction mixture was filtered. The resulting solid matter was washed with small quantities of cumene and methanol and then dried at 50° C. under reduced pressure, whereby 6.73 g of indigo were obtained. The yield of indigo was 60.2%, while the hourly yield of indigo was 12.0%.

EXAMPLE 21

In a three-necked 500-ml flask equipped only with a stirrer, a thermometer and a reflux condenser and not equipped with a Dean-Stark water separator, said reflux condenser being connected with a pressure reduction line at an upper outlet thereof, indole, molybdenum hexacarbonyl, cumene and the CHP solution (d), each in the same quantity as that in Example 20, were charged at once. The quantity of the water introduced into the reaction system was equal to that in Example 20 and corresponded to 0.06 mole per mole of indole. The resulting mixture was heated to 100° C. over oil bath under stirring and the pressure inside the reaction system was maintained at 180 mmHg. Similarly to Example 20, the reaction mixture continued refluxing during the reaction. The liquid condensed by the reflux condenser was returned directly to the reaction system. Thus, the reaction was conducted for 5 hours. After the completion of the reaction, the reaction mixture was subjected to post-treatment in a similar manner to Example 20, whereby 6.25 g of indigo were obtained. The yield of indigo was 55.9% and the hourly yield of indigo was 11.2%.

EXAMPLE 22

The reaction and after treatment were conducted in a similar manner to Example 20 except that 2.36 g (8.5 mmol) of triphenylsilanol were further added as an additive, whereby indigo was obtained in 66.2% yield and 13.2% hourly yield.

EXAMPLE 23

The reaction and after treatment were conducted in a similar manner to Example 20 except 1.04 g (8.5 mmol) of benzoic acid and 2.36 g (8.5 mmol) of triphenylsilanol were further added as additives, whereby indigo was obtained in 75.9% yield and 15.2% hourly yield.

What is claimed is:

1. A process for the preparation of an indigo compound from a corresponding indole compound which is unsubstituted at the 2- and 3-positions, which comprise reacting the indole compound with an organic hydroperoxide which has a hydroperoxy group represented by the formula

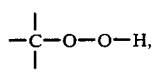

in the presence of a metal selected from the group consisting of the metals in Groups 4, 5 and 6 of the periodic table or a compound of the metal as a catalyst while removing from the reaction system water introduced into the reaction system and formed during the reaction.

2. The process of claim 1, wherein the amount of water introduced into the reaction system is not greater than 1 mole per mole of the indole compound.

3. The process of claim 1, wherein the reaction is conducted in the presence of at least one solvent selected from the group consisting of aliphatic and alicyclic hydrocarbons, aromatic hydrocarbons, halogenated aliphatic and aromatic compounds, ethers, alcohols, ketones, esters, carbonates and aromatic nitro compounds.

4. The process of claim 3, wherein the solvent is a secondary or tertiary alcohol.

5. The process of claim 1, further comprising conducting the reaction in the presence of at least one additive selected from the group consisting of aliphatic carboxylic acids, aromatic carboxylic acids and organic silanols.

6. The process of claim 5, wherein the additive is an aliphatic and aromatic carboxylic acid selected from the group consisting of acetic acid, propionic acid, stearic acid, pheylacetic acid, oleic acid, cinnamic acid, benzoic acid, paramethylbenzoic acid, methachlorobenzoic acid and parahydroxybenzoic acid.

7. A process for the preparation of an indigo compound from a corresponding indole compound which is unsubstituted at the 2- and 3-positions, which comprises reacting the indole compound with an organic hydroperoxide which has a hydroperoxy group represented by the formula

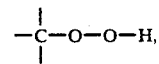

in the presence of a metal selected from the group consisting of the metals in Groups 4, 5 and 6 of the periodic table or a compound of the metal as a catalyst while restricting the amount of water which is introduced into the reaction system to a level not greater than 1 mole per mole of the indole compound.

8. The process of claim 7, wherein the reaction is conducted in the presence of at least one solvent selected from the group consisting of aliphatic and alicyclic hydrocarbosn, aromatic hydrocarbosn, halogenated aliphatic and aromatic compounds, ethers, alcohols, ketones, esters, carbonates and aromatic nitro compounds.

9. The process of claim 8, wherein the solvent is a secondary or tertiary alcohol.

10. The process of claim 7, further comprising conducting the reaction in the presence of at least one additive selected from the group consisting of aliphatic carboxylic acids, aromatic carboxylic acids and organic silanols.

11. The process of claim 10, wherein the additive is an aliphatic and aromatic carboxylic acid selected from a group consisting of acetic acid, propionic acid, stearic acid, phenylacetic acid, oleic acid, cinnamic acid, benzoic acid, paramethylbenzoic acid, methachlorobenzoic acid and parahydroxybenzoic acid.

12. The process of claim 1, wherein the metal is selected from the group consisting of the metals in Groups 4, 5 and 6 of the periodic table or a compound of the metal is a compound of titanium or molybdenum.

13. The process of claim 7, wherein the metal selected from the group consisting of the metals in Groups 4, 5 and 6 of the periodic table or a compound of the metal is a compound of titanium or molybdenum.

* * * * *